United States Patent
Guo et al.

(10) Patent No.: US 7,133,927 B2
(45) Date of Patent: Nov. 7, 2006

(54) METHOD AND APPARATUS FOR SUPPORTING REAL-TIME MULTI-USER DISTRIBUTED APPLICATIONS

(75) Inventors: Katherine H Guo, Eatontown, NJ (US); Yow-Jian Lin, Edison, NJ (US); Sanjoy Paul, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 724 days.

(21) Appl. No.: 10/135,053

(22) Filed: Apr. 29, 2002

(65) Prior Publication Data

US 2003/0204565 A1    Oct. 30, 2003

(51) Int. Cl.
*G06F 15/16* (2006.01)

(52) U.S. Cl. ............... 709/234; 709/232; 709/231; 709/205

(58) Field of Classification Search ............... 709/205, 709/234, 231, 235, 232; 370/395.4; 718/102; 713/501, 502
See application file for complete search history.

(56) References Cited

U.S. PATENT DOCUMENTS

| 6,604,145 B1 * | 8/2003 | Bell et al. ............ 709/232 |
| 6,763,371 B1 * | 7/2004 | Jandel .................. 709/204 |
| 6,917,984 B1 * | 7/2005 | Tan ....................... 709/238 |
| 2003/0123491 A1 * | 7/2003 | Couillard ............. 370/508 |
| 2003/0188192 A1 * | 10/2003 | Tang et al. ........... 713/201 |
| 2005/0083939 A1 * | 4/2005 | Yasukawa et al. .... 370/395.1 |

OTHER PUBLICATIONS

Allman et al, "On Estimating End-to-End Network Path Properties", ACM SIGCOMM '00, Aug. 31-Sep. 3, 1999.*
Allman et al, "On Estimating End-to-End Network Path Properties", ACM SIGCOMM '00, Aug. 31-Sep. 3, 1999.*
Allman et al., "On Estimating End-to-End Network Path Properties", ACM SIGCOMM '99, Aug. 31-Sep. 3, 1999.

* cited by examiner

*Primary Examiner*—Rupal Dharia
*Assistant Examiner*—Brian J. Gillis
(74) *Attorney, Agent, or Firm*—Matthew J. Hodulik

(57) ABSTRACT

The present invention provides a network support mechanism, called Sync-VPN, that is transparent to real-time, multi-user distributed applications, such as online multi-player games in which the order of player actions is critical to the outcome. The invention uses a client/server application model, where a server coordinates state updates based on action messages sent by clients. The invention builds on bandwidth-quaranteed VPN service to ensure predictable packet delay and loss characteristics, thereby providing predictable packet service, state update fairness, and player action fairness. A Sync-out mechanism synchronizes delivery of state updates to all players enabling them to react to the same update fairly. A Sync-in mechanism processes action messages from all players in a fair order based on real-time occurrence. Sync-VPN employs a round-trip time estimation algorithm essential to message latency estimation in the Sync-out and Sync-in mechanisms.

15 Claims, 2 Drawing Sheets

Message sequence, delay and response time

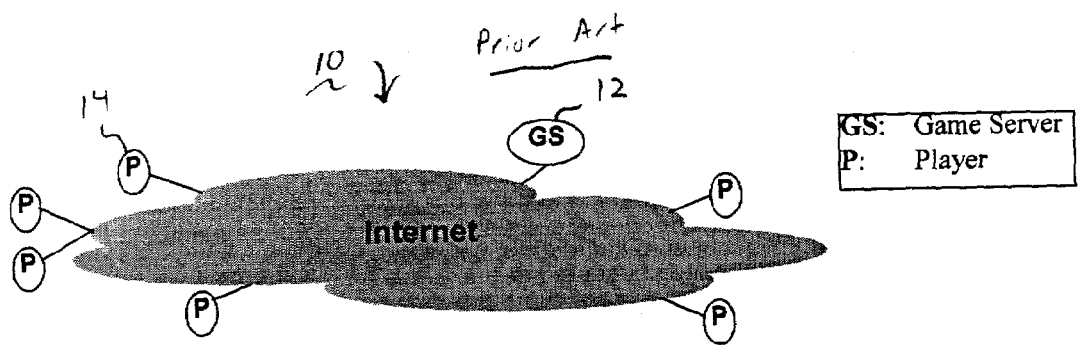
Figure 1 Multi-player online game architecture
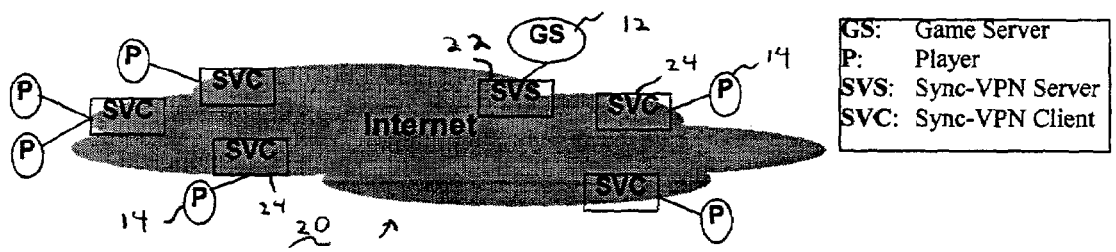
Figure 2 Sync-VPN support for multi-player online games
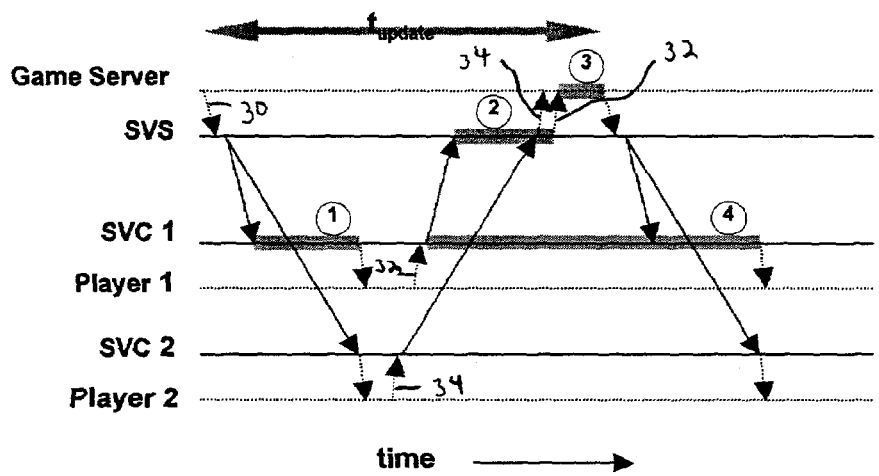
Figure 3 Message sequence, delay and response time

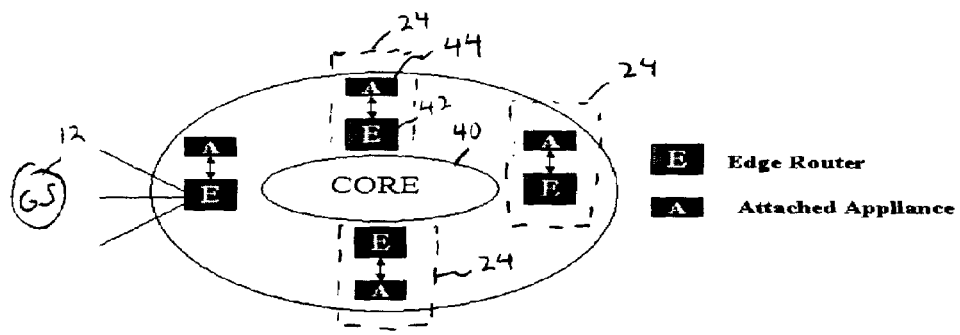
Figure 4
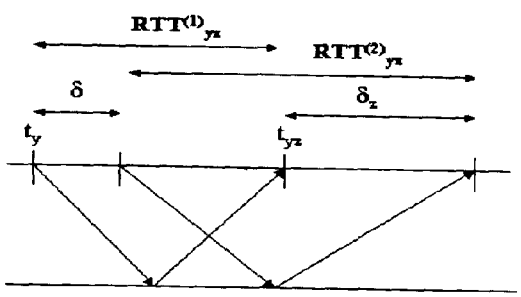
Figure 5
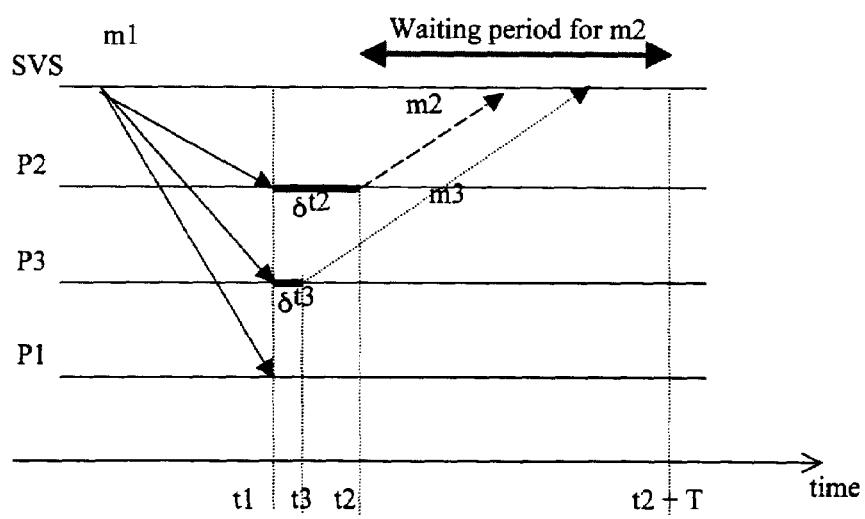
Figure 6 Fair ordering and waiting period

METHOD AND APPARATUS FOR SUPPORTING REAL-TIME MULTI-USER DISTRIBUTED APPLICATIONS

FIELD OF THE INVENTION

The present invention relates generally to communications networks, and more particularly to the support of real-time multi-user distributed applications on such networks.

BACKGROUND OF THE INVENTION

IP Networks are becoming more sophisticated in terms of providing more than just best-effort services. This is possible because of a new generation of IP routers and switches that take advantage of the embedded base of ATM switches in a service provider's network. As a result, a service provider can provide value-added IP services to their customers. Examples of such value-added services include Virtual Private Network (VPN) services, managed bandwidth services, managed firewall services, traffic filtering services and so on. So far there are two main categories of VPN: (1) Secure VPNs and (2) VPNs with Quality of Service. Secure VPNs provide secure connectivity to a multi-site customer network while VPNs with Quality of Service provide connectivity with some guarantees in bandwidth. Many people are trying to extend Quality of Service VPNs to provide some assurances in terms of bounded delay and loss.

Real-time multi-user distributed applications, such as online multi-player games or distributed interactive simulations (DIS), are becoming increasingly popular due to the prolificacy (proliferation) of broadband Internet access. Though online multi-player gaming is enjoying its increasing popularity, there is still much room for performance improvement, especially in cases when players in widely distributed geographical locations play a game together. Currently each game application deals with network performance variants at the application level, a practice that yields drastically different and often unsatisfactory gaming experiences. To gaming network service providers, a better network support for more consistent gaming performance could attract more subscribers and/or more network usage per subscriber, thus generate more revenue.

Most online multi-player games today are implemented based on a client/server model. In this model, a game server is set up and all players logon to this game server to play the game against each other. Player actions are forwarded from each player station to the game server in messages. The game server then processes the actions in sequence, and notifies player stations the effects of player actions, also in messages. The only communication in the system is between the game server and the player stations. Player stations themselves do not send messages to one another. Neither do they play any active roll in deciding the ordering of actions in the game.

With a client/server model it is easier to maintain a consistent game state at all player stations. Nevertheless, best-effort support of current internet traffic cannot offer reasonable, expected network delay and packet loss bounds. As a result, players often experience erratic object movement and stalled game progress. In addition, because the game server is in charge of updating global states, players will not see each state change from the game server until after certain network delay. Since this network delay is different for different players, unfairness is created among players in accessing the latest state.

Furthermore, the messages carrying player actions will take different time to reach the game server. Without compensating for execution environment differences, a player further away from the game server will suffer from longer message delay, even if he/she is the fastest player to react to state changes. A need therefore exists to provide improved support of real-time multi-user distributed applications, such as on-line gaming.

SUMMARY OF THE INVENTION

The present invention addresses the shortcoming of the prior art by providing a network support mechanism that is transparent to real-time multi-user distributed applications. In particular, the proposed invention is well suited for the type of online multi-player games in which a fair order of player actions is critical to the outcome. Without fairness support, remote players often receive much delayed data to act on, and their actions cannot compete in time with other players. The present invention proposes a network support mechanism, called Sync-VPN, for real time multi-user distributed applications such as multi-player online games. The approach assumes a client/server application model, where the server is responsible for coordinating state updates based on action messages sent by the clients. The approach addresses three desired features: predictable packet service, state update fairness, and player action fairness. It builds on top of bandwidth guaranteed VPN service to ensure predictable packet delay and loss characteristics. It uses a Sync-out mechanism to synchronize the delivery of state updates to all players in order for them to react to the same update fairly. Its Sync-in mechanism processes action messages from all players in a fair order based on their real-time occurrence. Sync-VPN employees a round trip time estimation algorithm that is essential to both Sync-out and Sync-in mechanisms in estimating message latency. It also proposes three Sync-in algorithms that dictate a trade-off between added delay and improved fairness.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 1 is an exemplary prior art architecture for on-line gaming;

FIG. 2 is an exemplary architecture for on-line gaming according to the present invention;

FIG. 3 illustrates an exemplary message sequence in accordance with the present invention.

FIG. 4 is another exemplary architecture for on-line gaming according to the present invention;

FIG. 5 is an exemplary illustration to aid in the calculation of a delta value according to the present invention; and FIG. 6 is an exemplary message sequence illustrating fair ordering according to the present invention.

DETAILED DESCRIPTION

The present invention is a method and apparatus for implementation of a new service, termed Sync-VPN. The invention solves many of the shortcomings related to multi-player online games, including: predictable packet service, state update fairness, and player action fairness that were alluded to in the background section of the application.

In order to better understand the advantages of the invention, a brief introduction to the four main focus areas of the present invention referenced above is provided. The first area, predictable packet service relates to the concept that each player should experience slight variation in packet delay and loss. Simply stated, the present invention Sync-VPN builds on top of bandwidth guaranteed VPN services and, as such, leverages the more predictable packet loss and delay characteristics offered by MPLS/DiffServ capable core/edge routers and switches.

State update fairness represents an inventive concept that all players should receive each game state update from the server at the same time, which is termed herein Sync-out. Sync-out guarantees that if an update message arrives at certain player stations before those of other players, the message will be properly queued up at the player stations (or at a point in the network) and then delivered only after the message has had time to arrive at all player stations. As a result, all players can react to the same global state fairly.

Player action fairness represents another inventive concept that the game server will process action messages from all players in a fair order based on their real-time occurrence, which is termed herein Sync-in. If a game server can wait long enough to receive every action message reliably, then the server can guarantee to process all action messages fairly. In reality, the waiting period at the server must be bounded due to the real-time nature of interactive games. Sync-VPN proposes several Sync-in algorithms that dictate a trade-off between added delay and improved fairness.

Round trip time estimation relates to improved methodologies for estimating the time in which it takes traffic to traverse a network between various points. Both Sync-out and Sync-in mechanisms rely on good estimates of message latency to perform well.

Referring to FIG. 1, an exemplary prior art multi-player gaming architecture 10 is shown. In this architecture 10 a game server 12 is set up and all players at respective player stations 14 logon to the game server to play the game against each other. As previously stated, player actions are forwarded from each player station 14 to the game server 12 in messages. The game server then processes the actions in sequence, and notifies player stations the effects of player actions, also in messages. The only communication in the system is between the game server 12 and the player stations 14.

FIG. 2 shows an exemplary network architecture 20 for implementation of the present invention having Sync-VPN support. Game-independent network support is provided for client/server based distributed multi-player online games using the exemplary architecture 20. As shown, a "Sync-VPN Client (SVC)" 24 and "Sync-VPN Server (SVS)" 22 refer to the network support modules that interact with player applications and game server applications, respectively. The SVC 24 and SVS 22 are responsible for delivering messages to game applications in a synchronized and fair fashion. The modules can run along side with applications on the same host (e.g., shared processing), or they can run on the edge routers that hosts are connected to and can be thought of as a type of attached appliance for the associated router (including, for example, separate processing and software). As would be understood by a person skilled in the art, the same algorithms for the hosts can be run on edge routers if the network delay from a host to its respective edge router is negligible. More specifically, with regard to FIG. 2, it would be understood that the SVS algorithm can run on a SVS host or an edge router to which the SVS host is connected. Along those same lines, SVC algorithms can run on a SVC host or an edge router to which the SVC host is connected. Based on the widespread deployment of Global Positioning System (GPS), a reasonable assumption is made that the hosts and routers of the system of FIG. 2 have synchronized clocks.

FIG. 3 illustrates an exemplary message passing sequence in a client/server based multi-user online game application with Sync-VPN support according to the present invention. Referring to FIG. 3 in connection with FIG. 2, Player 1 and Player 2 (14) communicate with the game server 12 through the SVS 22 and their respective SVCs 24, SVC 1 and SVC 2. The game server 12 typically sends periodic game state update messages to all players. The state update period $t_{update}$ could, for example, be 40 ms for a smooth showing of game states at 25 frames per second. In some games, such as Quake, $t_{update}$ is a configurable parameter of a value between 50 and 200 ms. For each state update message sent by the game server, SVS 22 determines how to accomplish Sync-out. That is, based on its knowledge of delays between itself and SVCs 24, the SVS 22 determines when the message should be delivered by each SVC to the corresponding player. The SVS determines what the delay is for each SVC, and SVC executes the extra delay. So together Sync-out is executed by SVS and SVCs. Mark 1 in FIG. 3 indicates the added delay at SVC 1 due to Sync-out for message 30.

After a player receives an update, the player sends action messages, which are forwarded to the SVS by a respective SVC. In order to implement Sync-in according to the present invention, upon receiving an action message, the SVS must decide how long it needs to hold on to the message before delivering it to the game server. For example, message 32 from Player 1, though it reached SVS ahead of the message 34 from Player 2, the SVS 22 of the present invention actually delivers message 34 to the game server first because Player 2 reacted to the same update faster. Mark 2 in FIG. 3 represents the added delay experienced by message 32 from Player 1 due to Sync-in and shows that message 34 from Player 2 is received by the game server before message 32 from Player 1 is received by the game server. As mentioned, the Sync-n delay ensures player action fairness since it accounts for network delays and in the context of the exemplary message sequence in FIG. 3 was able to account for the fact that Player 2 reacted to the update message faster, even though the Player 1 response was received first by the SVS due to shorter network delay.

A player will not realize the effect of an action message until the next state update message containing the effect reaches the player. Mark 3 in FIG. 3 represents the intrinsic delay at the SVS due to periodic state updates. Mark 4 defines the response time of an action message. Note that in the scenario shown in FIG. 3, the response time of the Player 1 action message 32 and Player 2 action message 34 remain the same with or without added delay due to Sync-in. However, with Sync-in, the Player 2 action message 34 will receive the added benefit of fair order. In general, when using Sync-in, the response time of an action message could increase in a multiple of $t_{update}$, with $$\left( \left\lceil \frac{t_{Sync\text{-}in}}{t_{update}} \right\rceil \times t_{update} \right)$$

as the worst case, where $t_{Sync\text{-}in}$ is the added delay due to Sync-in.

A significant innovation presented herein concerns the manner in which Sync-out and Sync-in are realized. In one exemplary embodiment of the invention, each update message from the SVS to each SVC includes a tag of scheduled delivery time. A SVC must deliver each update message no earlier than the time specified in the delivery time tag for Sync-out. All SVCs will also timestamp each action message they send to the SVS so that the SVS can use the timestamp as the basis for Sync-in.

Round Trip Time Estimation

Both Sync-out and Sync-in algorithms rely on network delay estimation. In Sync-out, in order to decide on the same delivery time for the same state update message sent by the server SVS to all the clients SVCs, SVS needs to estimate one-way latency from SVS to each of the SVCs. In Sync-in, in order to decide the delivery order for each player action message, SVS needs to estimate one-way latency from each of the SVCs to SVS. It is a common practice to assume network path is symmetric, therefore half of the round trip time between SVS and each SVC is the one-way delay between them.

Referring to FIG. 5, a representative methodology for determining the round trip time is described.

As a first step of one exemplary embodiment for the round trip time estimation, the SVS sends a pair of packets to every participant (SVC) in a particular gaming session at times $t_y$ and $t_y+\delta$ respectively. Each endpoint (SVC) reflects the packet back to the SVS. Assuming that the SVS receives the packet pairs from the SVC at endpoint z at times $t_{yz}$ and $t_{yz}+\delta_z$ respectively. A pair of round trip times ($RTT_{yz}^{(1)}$, $RTT_{yz}^{(2)}$) and the variation in the two round trip times $RTTVAR_{yz}(=|RTT_{yz}^{(2)}-RTT_{yz}^{(1)}|)$ are then recorded. With the newly recorded pair of round trip times and the previous smoothed average of round trip time $RTT_{yz}^{prev}$ between endpoints y and z, a new exponentially-weighted moving average $RTT_{yz}^{cur}$ is thus calculated (see Step 5d in the RTT estimation algorithm below). Similarly, based on $RTTVAR_{yz}^{prev}$ and $RTTVAR_{yz}^{(i)}=|RTT_{yz}^{(i)}-RTT_{yz}^{prev}|$, i=1, 2, a new exponentially-weighted moving average of $RTT_{yz}$ variation, $RTTVAR_{yz}^{cur}$, is calculated. The current estimated round trip time between endpoints and y and z, $eRTT_{yz}$, is then $eRTT_{yz}=RTT_{yz}^{cur}+N \times RTTVAR_{yz}^{cur}$, where $N=f(RTTVAR_{yz}^{cur}, RTTVAR_{yz})$ is a scale function. An exemplary embodiment of the function $f$ is $$N = \begin{cases} 4, & RTTVAR_{yz} > RTTVAR_{yz}^{cur} \\ 2, & \frac{1}{2}RTTVAR_{yz}^{cur} \le RTTVAR_{yz} \le RTTVAR_{yz}^{cur} \\ 1, & RTTVAR_{yz} < \frac{1}{2}RTTVAR_{yz}^{cur} \end{cases}$$

As can be appreciated the calculation of $eRTT_{yz}$ as described conservatively estimates a future round trip time by adding a multiple of average RTT variation to the average RTT mean based on the current RTT variation. Thus, the calculation captures the long-term average and the short-term trend of RTT changes, similar to the technique commonly used in TCP round trip time estimation. At the same time, the scale function $f$ enables "just-enough" variation padding to minimize the possibility of over-estimated delay and unnecessary prolonged delivery time.

The round trip time calculation described above can be represented in its algorithm form as follows.

RTT Estimation Algorithm Between SVS and SVCs:

1. Each SVS y∈Y sends a pair of probe packets back to back to all z∈Z (where Z=Y-{y}) at times $t_y$ and $t_y+\delta$ respectively.
2. Each endpoint z (SVC) reflects the packets back to y.
3. Assume that SVS y gets back the packet pairs from z at times $t_{yz}$ and $t_{yz}+\delta z$ respectively.
4. Initially, SVS y sends one packet pair back-to-back to all SVCs in z∈Z (where Z=Y-{y}). Get initial value of average RTT mean and variation, $RTT_{yz}^{prev}$ and $RTTVAR_{yz}^{prev}$.
  a. $RTT_{yz}^{(1)}=t_{yz}-t_y$; $RTT_{yz}^{(2)}=(t_{yz}+\delta_z)-(t_y+\delta)$
  b. $RTT_{yz}^{prev}=(1-\alpha) \times RTT_{yz}^{(1)}+\alpha \times RTT_{yz}^{(2)}$
  c. $RTTVAR_{yz}^{(i)}=|RTT_{yz}^{(i)}-RTT_{yz}^{prev}|$, i=1,2
  d. $RTTVAR_{yz}^{prev}=(1-\beta) \times RTTVAR_{yz}^{(1)}+\beta \times RTTVAR_{yz}^{(2)}$
5. For every new packet pair sent, compute
  a. $RTT_{yz}^{(1)}=t_{yz}-t_y$; $RTT_{yz}^{(2)}=(t_{yz}+\delta_z)-(t_y+\delta)$
  b. $RTTVAR_{yz}^{(i)}=|RTT_{yz}^{(i)}-RTT_{yz}^{prev}|$, i=1,2
  c. $RTTVAR_{yz}=|\delta_z-\delta|$
  d. $RTT_{yz}^{cur}=(1-\alpha) \times ((1-\alpha) \times RTT_{yz}^{prev}+\alpha RTT_{yz}^{(1)})+\alpha \times RTT_{yz}^{(2)}$
  e. $RTTVAR_{yz}^{cur}=(1-\beta) \times RTTVAR_{yz}^{prev}+\beta \times RTTVAR_{yz}^{(1)}$
  f. $RTTVAR_{yz}^{cur}=(1-\beta) \times RTTVAR_{yz}^{cur}+\beta \times RTTVAR_{yz}^{(2)}$
  g. $eRTT_{yz}=RTT_{yz}^{cur}+f(RTTVAR_{yz}^{cur}, RTTVAR_{yz}) \times RTTVAR_{yz}^{cur}$
  h. $RTT_{yz}^{prev}=RTT_{yz}^{cur}$; $RTTVAR_{yz}^{prev}=RTTVAR_{yz}^{cur}$;

SVS is responsible for recording the current round trip time estimation between itself and all the SVCs. In particular, SVS y records $eRTT_{yz}$ for all SVCs in z∈Z (where Z=Y-{y}).

Note there are two components of RTT estimation: one is the smoothed estimation of RTT, the other is the current variation of RTT. The smoothed RTT estimation is conducted using the commonly used exponentially-weighted moving average estimator.

In RTT measurement for TCP, $$\alpha = \frac{1}{8} \text{ and } \beta = \frac{1}{4}.$$

Messages sent from the SVS to SVCs are normally over UDP, only occasionally over TCP. However, the guideline for RTT estimation applies to any type of connection.

The reason to add a multiple of delay variations to RTT measurement is to prevent underestimation of RTT. In TCP RTT estimation, the multiplicity factor is N=4. Since the estimation formula we are proposing is general enough to apply to both TCP and UDP, we can vary N from 1 to 4.

Sync-Out

In general, Sync-out needs to address two issues: methods for deciding the delivery time of each update message, and mechanisms for transporting the messages.

To choose a delivery time for an update message such that the update message can reach all players at the same time, the SVS maintains up-to-date information about the delay from itself to every SVC and selects a given time, e.g., the longest delay, as the delivery time. It can do so by sending probing packets, or relying on the delay guarantee offered through QoS VPN. If delay characteristics are similar in both directions, the SVS can also estimate the delay of sending update messages based on the delay of action messages it receives from SVCs.

Since each update message carries a delivery time tag, Sync-out does not require special transport support in the network. As long as the clocks at SVS and SVCs are synchronized, an SVC can compare the delivery time tag of each received update message and the current local time to decide the delivery time. Occasionally, an update message may arrive at an SVC later than the time specified in the delivery time tag. In such case, the SVC may deliver the update message without further delay, or take other action depending on the specific application of the Sync-VPN service, such as discard the packet or have a notification to the receiver associated with the late delivery of a specified number of packets.

Assuming a VPN network of three players and a game server 12 for a given gaming application as shown in FIG. 4, the Sync-out portion of the present invention including exemplary delay calculation will be described. It should be noted that the architecture (shown in FIG. 4) assumes a core network 40 surrounded by a set of edge routers 42 (referred to as "E" in the diagram above). One exemplary embodiment assumes an appliance 44 (referred to as "A" in the above diagram) attached to the edge router to form a SVC 24 or SVS 22. However, the appliance is not a necessary component in the architecture and the Sync-out processing may be embedded in the edge router as a software or hardware module or in the hosts, as described previously.

As discussed above, the general Sync-out methodology can be represented as follows:

Generalized Sync-out procedure:
1. A packet arrives from the game server GS at ingress pointy e.g., SVS, at time t where y∈Y and Y is the set of all ingress points participating in Sync-out. Ingress point y attaches a time-stamp T=t+Δ to the packet and injects the packet into the VPN.
2. The time-stamped packet arrives at z∈Z (a destination, e.g., SVC) at time $t_z$ where Z=Y−{y}. If $t_z \leq T$, z delivers the packet at time T. Otherwise, the packet is delivered immediately or some other action is taken, for example, the packet is discarded.

A significant part of the Sync-out methodology is the calculation of a delay value Δ that ensures enough of a buffer in the transit time to all participants so that all participants receive the same packet at the same time.

Assuming network path is symmetric, the delay value Δ his half of the maximum round trip time (RTT) between the game server and all the participants. More precisely, $$\Delta = \frac{1}{2} \max(RTT_{yz})$$

for all z∈Z, where $eRTT_{yz}$ is the estimated round trip time between the SVS at endpoint y and the SVC at endpoint z.

With regard to the second issue for Sync-out, that of transport mechanisms, an edge router in the described architecture is capable of identifying and redirecting traffic based, for example, on 6-tuple [Src.IP, Dst.IP,Src.Port,Dst.Port, Protocol,TOS Byte]. The assumption is that the traffic belonging to a customer subscribing to the Sync-VPN service can be identified based on the 6-tuple (including but not limited to the TOS byte) and redirected to the attached appliance "A" which will implement the algorithms needed to provide the Sync-VPN service. The routers and/or appliances communicate with one another using IP/IP tunneling or IP/GRE tunneling where GRE refers to Generic Router Encapsulation.

Sync-In

The Sync-in portion of the invention addresses the ordering of action messages flowing in to the SVS to minimize the impact of message delay at the outcome of multi-player online games. The mechanisms for Sync-in operate at the SVS.

Three different embodiments of Sync-in mechanisms are presented, each offers a different trade-off between the action response time of individual players and the fairness among all players. All of the exemplary embodiments assume that each action message m sent from a player $P_i$ ($1 \leq i \leq n$ and n is the number of players) to the game server is stamped with the sending time s(m) at the corresponding $SVC_i$. When the message m reaches the Sync-VPN server SVS, the server notes the received time r(m). The proposed Sync-in algorithms depend on r(m) and s(m) for each message m sent from a player $P_i$, and the one-way latency from $SVC_i$ to SVS labeled as ps(i). Note that the one-way latency is half of the round-trip time measured by the SVS.

FIG. 6 illustrates the concepts of fair ordering and waiting period. In this example, the SVS announces a global state update with a multicast message m1. As described previously, the Sync-out mechanism delivers ml to players P1, P2 and P3 at the same time t1. P1 does not react to the global state change, whereas P2 and P3 react by sending messages m2 at time t2 and m3 at time t3 respectively. Because P3 reacts to the state change quickly (δt3<δt2, and thus t3<t2), the SVS should deliver m3 to the game server ahead of m2, which we refer to as a fair order, even though it receives m2 first. However, upon receiving m2, the SVS does not know if P1 or P3 has sent any action message earlier than P2 did. With two pieces of information, when P2 sent the message m2 and how long a message from each player can reach SVS, the SVS can decide how long it wants to wait before delivering m2 to the game server. The waiting period for m2, counting from the time m2 was sent, should be long enough for the SVS to receive (and deliver) m3 and to conclude that P1 did not react Because the global state update message ml is delivered at the same time to all players, by ordering messages sent by players according to their send-time, the SVS guarantees the order the messages are delivered is the same as the order they are sent.

The SVS implements the Sync-in algorithm as follows. It maintains a queue of received messages that are pending for delivery to the game server application for processing. It sorts the messages in the queue based on the sending time s(m) of each message m. Let h be the head message in the queue and s(h) is its sending time. Note that a newly arrived message may have an earlier sending time and be placed to the head of the queue. The SVS decides a waiting period T for the head message. If h is still the head message at time s(h)+T, then the SVS takes it out of the queue and delivers it to the game server.

Three exemplary embodiments of Sync-in algorithms according to the present invention, termed MaxWait, SelectWait, and TossWait, differ in the choice of the waiting period T for each head message.

MaxWait

MaxWait is a conservative Sync-in implementation. The idea is for the SVS to keep each action message m in the queue long enough to be able to receive any other action messages sent earlier than m by any players. Note that any action message could take as long as $T_{MaxWait}=\max(ps(i))$, $1 \leq i \leq n$, to reach the SVS. By choosing $T=T_{MaxWait}$ the SVS can deliver the head message h at time s(h)+max(ps(i)) and be reasonably sure that all action messages that have been sent to the SVS at earlier time from any player should have arrived at the SVS and been delivered. Therefore the message h is the next one to be delivered in order.

There is no guarantee that waiting for max(ps(i)) will always be long enough to cover all network delay cases. Occasionally a message may arrive that has a sending time earlier than the last delivered message. In that case, the algorithm considers the message too late to be processed in a fair order.

SelectWait

SelectWait is a Sync-in implementation that is more aggressive at delivering each action message at the earliest possible time. It takes advantage of the fact that each player takes time to send consecutive action messages.

Let tba(i) be the time between actions of player $P_i$. This value could be based on physical limitations, enforced by the network support, or measured at the SVS through action messages received. If the SVS has received an action message m that was sent by a player at time s(m), it is likely that $P_i$ will not send another action message until after s(m)+tba(i). Using this knowledge, the SVS waits for action messages from a selected subset of players. Specifically, for each head message h, the SVS first determines the set of players who could send action messages before s(h). The decision is based on when the last known message was sent by a player before s(h), and how much time between actions the player exhibits. The SVS maintains the following data:

s(h) is the sending time of the current head message h;

sbh(i), $1 \leq i \leq n$, is the sending time of the last action message that player $P_i$ sent before s(h);

ps(i), $1 \leq i \leq n$, is the network delay incurred by the action messages sent by player $P_i$; and tba(i), $1 \leq i \leq n$, is the time between actions of player $P_i$.

For the current head message h, the waiting period T thus becomes $T=T_{SelectWait}=\max\{ps(i)|(sbh(i)+tba(i)) \leq s(h), 1 \leq i \leq n\}$. Since the selection of the waiting period is now based on the message delay of a subset of players rather than that of all players, the average added delay due to Sync-in will be shorter compared to that of the MaxWait algorithm. Nevertheless, because the SelectWait algorithm uses a fact about user behaviors and is not a random guess, the algorithm does not compromise much to the overall fairness. When the data about the time between actions tba(i) are accurate, the SelectWait algorithm could achieve the best fairness possible with the least added Sync-in delay.

TossWait

Toss Wait is a probabilistic approach to the selection of waiting period. As stated earlier, even using $T_{MaxWait}$ could not yield 100% guarantee of total ordering. In realizing the statistical fact, the TossWait algorithm seeks to improve the responsiveness with less fairness guarantee.

Assume that the sending and received time of the current head message h is s(h) and r(h) respectively. Note that the SVS running the MaxWait algorithm will deliver the message h at the time s(h)+max(ps(i)). Hence, any choice of the waiting period T, $(r(h)-s(h)) \leq T \leq \max(ps(i))$, can yield some measure of fairness. The closer the value of T is to (r(h)−s(h)), the less added Sync-in delay and the better average response time. On the other hand, choosing a T closer to max(ps(i)) will be fairer to the players with longer message delay.

One simple way to choose the waiting period T in the TossWait algorithm is to select a value between (r(h)−s(h)) and max(ps(i)) with a uniform probability distribution. The simple strategy, nonetheless, may be extremely unfair to the player with the longest message delay for the following reason. Let $P_k$ be the player experiencing the longest message delay, that is, ps(k)=max(ps(i)), $1 \leq i \leq n$. Any time when $P_k$ sends an action message at about the same time as other players do, the SVS will receive the messages from other players first. However, because of the uniform distribution, the probability of the SVS choosing T=ps(k) in delivering these messages is close to 0. As a result, most of the time the SVS will deliver the messages it has received from other players before it receives the one sent at about the same time by $P_k$.

A better TossWait strategy is to use a probability function based on selected waiting period values. One such percentile-based function is the following. Let $T_{pp}$ (X) be the X-percentile delay value of all the ps(i), $1 \leq i \leq n$ i.e., X-percentile of ps(i) values are less than $T_{pp}$ (X). The SVS then chooses to follow the waiting period $T_{pp}$ (X) Y-percent of the time. In other words, the SVS follows a set of percentile-probability pairs $$\left\{ (Xj, Yj) \middle| \sum_j Yj = 100\% \right\}.$$

It should be clear that the MaxWait algorithm is an extreme instance {(100,100)} of this TossWait strategy.

Given a set of percentile-probability pairs {(Xj,Yj)}, any player whose message delay is less than $T_{pp}$ (X) will be treated fairly $$\sum_{X \geq Xj} Yj\%$$

of the time. For example, with a set {(60,10%)(80,20%)(90, 30%)(100,40%)}, the SVS running the TossWait algorithm will treat a player with $85^{th}$ percentile message delay fairly 70% of the time.

Thus, the present invention proposes a network support mechanism, called Sync-VPN, for real time multi-user distributed applications such as multi-player online games. The approach assumes a client/server application model, where the server is responsible for coordinating state updates based on action messages sent by the clients. The approach addresses three desired features: predictable packet service, state update fairness, and player action fairness. It builds on top of bandwidth guaranteed VPN service to ensure predictable packet delay and loss characteristics. It uses a Sync-out mechanism to synchronize the delivery of state updates to all players in order for them to react to the same update fairly. Its Sync-in mechanism processes action messages from all players in a fair order based on their real-time occurrence. Sync-VPN employees a round trip time estimation algorithm that is essential to both Sync-out and Sync-in mechanisms in estimating message latency. It also proposes three Sync-in algorithms that dictate a trade-off between added delay and improved fairness.

Sync-VPN service provides a transparent network support to many real-time multi-user applications. Because of better user experiences offered through the service, not only more users will be able to enjoy on-line gaming, each user also will tend to stay on the network longer to play games which may, in turn, generate more revenues for gaming network service providers.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A method of providing synchronous delivery of data traffic to users of a network from a given location, said method comprising the steps of:
    deriving a worst case delivery time for data injected into said network to be delivered to any of said users, wherein said worst case delivery time is derived as half of a maximum estimated round trip time from plurality of estimated round trip times between said given location and said respective users, wherein each estimated round trip time is derived based on a round trip time (RTT) estimation algorithm;
    assigning a delivery time to said data traffic injected into said network based on said worst case delivery time;
    delaying, if necessary, said data traffic from reaching its user prior to said delivery time; and
    delivering said data traffic to said users of said network at said delivery time.

2. The method of claim 1, wherein said data traffic is identified by a value in at least one field of said data as belonging to a synchronous delivery service.

3. The method of claim 2, wherein said data traffic is filtered according to said value for processing in said network.

4. The method of claim 2, wherein said identified value is a 6-tuple identification including Src.IP, Dst.IP, Src.Port, Dst.Port, Protocol, and TOS fields.

5. The method of claim 1, where said network is a virtual private network.

6. The method of claim 1, wherein said RTT estimation is the mean round trip time plus a round trip time variance factor.

7. The method of claim 1, further including providing substantially synchronous delivery of traffic injected from said users of said network to said given location.

8. The method of claim 5, wherein an application of said synchronous delivery of data traffic is selected from the group consisting of multi-player games, synchronized music and video conferencing.

9. A method of providing fairly ordered responses of data traffic from users of a network to another location in said network, said method comprising the steps of:
    deriving a waiting period for data injected into said network from a user to be delivered to said another location, wherein said waiting period partially depends upon a plurality of estimated round trip times between said respective users and said another location, wherein each estimated round trip time is derived based on a round trip time (RTT) estimation algorithm;
    ordering said data traffic received from said users based on a send-time value associated with said data traffic injected into said network;
    delaying said delivery of said data traffic for said waiting period;
    delivering said data traffic to said another location in a fair order based on said step of ordering after said waiting period has expired.

10. The method of claim 9, wherein said delay period is long enough to enable receipt of a response from any user within a given response window.

11. The method of claim 9, where said delay period is based on message delay in said network of a subset of said users.

12. The method of claim 9, wherein said delay time T is represented as $(r(h)-s(h)) \leq T \leq \max(ps(i))$, where the sending and received time of the current head message h is $s(h)$ and $r(h)$ respectively, and the message delay from player $P_i$ to the another location is denoted as $ps(i)$ and a probability function is applied to T.

13. A method of operating a server for providing synchronous delivery of data traffic to a select grouping of clients in a network, said method comprising the steps of:
    deriving an estimated delivery time for data injected into said network to be delivered to any of said clients, wherein said estimated delivery time is derived from a worst case delivery time, wherein said worst case delivery time is derived as half of a current worst estimated round trip time from a plurality of estimate round trip times between said server and said respective clients, wherein each estimated round trip time is derived based on a round trip time (RTT) estimation algorithm;
    assigning an actual delivery time to said data traffic injected into said network based on said estimated delivery time; and
    sending said data traffic to said clients of said network, wherein said data traffic from said server is set to be synchronously delivered to said grouping of clients at said actual delivery time.

14. The method of claim 13, wherein each estimated round trip time between said server and said respective clients is a mean round trip time plus a round trip time variance factor.

15. A method of operating a client device in a client server system for providing synchronous delivery of data traffic to a select grouping of clients in a network, said method comprising the steps of:

receiving data traffic from said server having a delivery time value associated therewith, wherein said delivery time value is determined based on a worst-case delivery time derived as half of a maximum estimated round trip time from a plurality of estimated round trip times between said server and said respective clients, wherein each estimated round trip time is derived based on a round trip time (RTT) estimation algorithm;

delaying, if necessary, said data traffic reaching its client prior to said delivery time value; and delivering said data traffic to said clients of said network at said delivery time value.

* * * * *